United States Patent [19]
Di Sciascio

[11] 3,765,438
[45] Oct. 16, 1973

[54] FLAG ADJUSTING VALVE HAVING A FACILITATED FLOW

[76] Inventor: Nicola Di Sciascio, Bari, Italy

[22] Filed: Oct. 13, 1971

[21] Appl. No.: 188,745

[30] Foreign Application Priority Data
Oct. 13, 1970 Italy .............................. 30899 A/70

[52] U.S. Cl. .................................. 137/219, 251/58
[51] Int. Cl. ........................................... F16k 31/12
[58] Field of Search ........................... 137/219, 124; 251/58

[56] References Cited
UNITED STATES PATENTS
| | | | |
|---|---|---|---|
| 1,564,252 | 12/1925 | Larner | 137/219 |
| 1,679,774 | 8/1928 | Larner | 137/219 |
| 2,442,625 | 6/1948 | Thomas | 137/219 |
| 3,102,550 | 9/1963 | Shand et al. | 137/219 |

FOREIGN PATENTS OR APPLICATIONS
1,137,914 10/1962 Germany .......................... 137/219

*Primary Examiner*—Henry T. Klinksiek
*Attorney*—Ralph M. Watson

[57] ABSTRACT

The present invention relates to an adjusting valve with a single seat and a reversible drive which, owing to its particular shape and configuration and to the fact that it has a balanced sliding shutter, allows a less obstructed flow (therefrom the denomination of FLAG valve) and hence a high delivery coefficient, the use of a simple, small servomotor, reversal of the servomotor action without disassembling the valve body, and an easy manual adjustment, both single- and double- acting, as well as the elimination of the necessity for a positioner.

12 Claims, 5 Drawing Figures

FLAG ADJUSTING VALVE HAVING A FACILITATED FLOW

In the prior art, different types of single seat adjusting valves are known. However, all of these present serious inner load losses and consequent low delivery coefficients as the sliding shutter does not operate in the direction of the fluid axis but in a direction perpendicular to the flow, which does not run linearly from the valve inlet to the valve outlet but undergoes a sudden deviation in correspondence with the same valve sliding shutter. On the other hand, this zigzag flow inside the known valves, beside causing remarkable load losses as already mentioned, gives rise also to vortexes as a consequence of the sudden deviations and therefore the possibility of damage from vibrations.

In all the known single seat adjusting valves, the valve sliding shutters are not balanced and therefore there is the necessity, in driving the valve, of strong and cumbersome servomotors able to overcome not only the friction but also the counteracting forces generated by the pressure differences acting on the non-balanced sliding shutters of the valves. In those past valves, moreover, there is the absolute necessity of a positioner, i.e., it is necessary to send the adjusting signal from the valve outlet to a positioner, since said signal is rather weak due to the remarkable load losses inside the valves so that it is not able to carry out the adjustment by itself.

Some types of known valves have a reversible drive, but for reversal of the servomotor action it is necessary to disassemble the valve body. Finally, known valves have to make use of mechanisms and complicated means for the single- and double-acting manual adjustment in order to limit the sliding shutter stroke at the valve opening and/or at the valve closing, e.g., for always obtaining a minimum and/or a maximum flow.

An object of the present invention is the provision of an adjusting valve with a single seat and a reversible drive which overcomes the above-mentioned drawbacks, i.e., the provision of a valve having a facilitated flow (FLAG valve) and therefore a high delivery coefficient; which valve can be operated by a small servomotor, does not require a positioner, and permits reversal of the servomotor action without disassembling the valve body, as well as an easy single- and double-acting manual adjustment. In the provision of a valve having an extremely reduced weight (about 50 percent), as compared with past valves, has a clear advantage in naval applications where weight plays a prominent part.

This is provided, according to the present invention, with a valve having a particular shape and configuration wherein the valve inlet and the valve outlet communicate, directly and axially, through a semi-annular chamber so that the flow is facilitated as it runs linearly without sudden deviations. There is, as a consequence, a remarkable decrease of the load losses, allowing elimination of a positioner, and the sliding shutter operates coaxially with the straight-line fluid stroke and is balanced by conveying the same inlet pressure of the valve through a hole on the sliding shutter body into a back compensating chamber provided at the mid-point of the valve body in opposition to the inlet. As the sliding shutter is balanced and only friction has to be overcome, the valve can now be driven by a simple, small servomotor which acts according to another distinctive feature of the invention: On an extremity of a driving lever rigidly connected, at its median point and outside the valve body, to a through stem acting as a fulcrum for said lever, said stem being perpendicularly oriented as to said driving lever and having keyed thereto, inside the valve body, a crank connected to the valve sliding shutter by means of a connecting rod. With such a linkage for driving the sliding shutter it will be understood that for the reversal of the servomotor action it is sufficient to let the same servomotor act on the other extremity of the driving lever without disassembling the valve body.

Also, the single- and double-acting manual adjustment is made very easy, as it is obtained by limiting the possible shifting of said driving lever by means of simple mechanical stop members acting on said driving lever at the same part as to the above-mentioned through stem acting as a fulcrum, whereon the servomotor acts in the case of single-acting manual adjustment or at the oher free extremity of the same driving lever in the case of double-acting manual adjustment respectively.

It is to be kept in mind, then, that the valve according to the present invention makes possible various working characteristic curves through a simple replacement of the sliding shutter with another one having a different section. The invention will now be described in detail with reference to the enclosed drawings illustrating a preferred practical embodiment, given only by way of unrestrictive example as technical and constructive variations may be produced in practice without exceeding the limits of the present invention.

Figure 1:
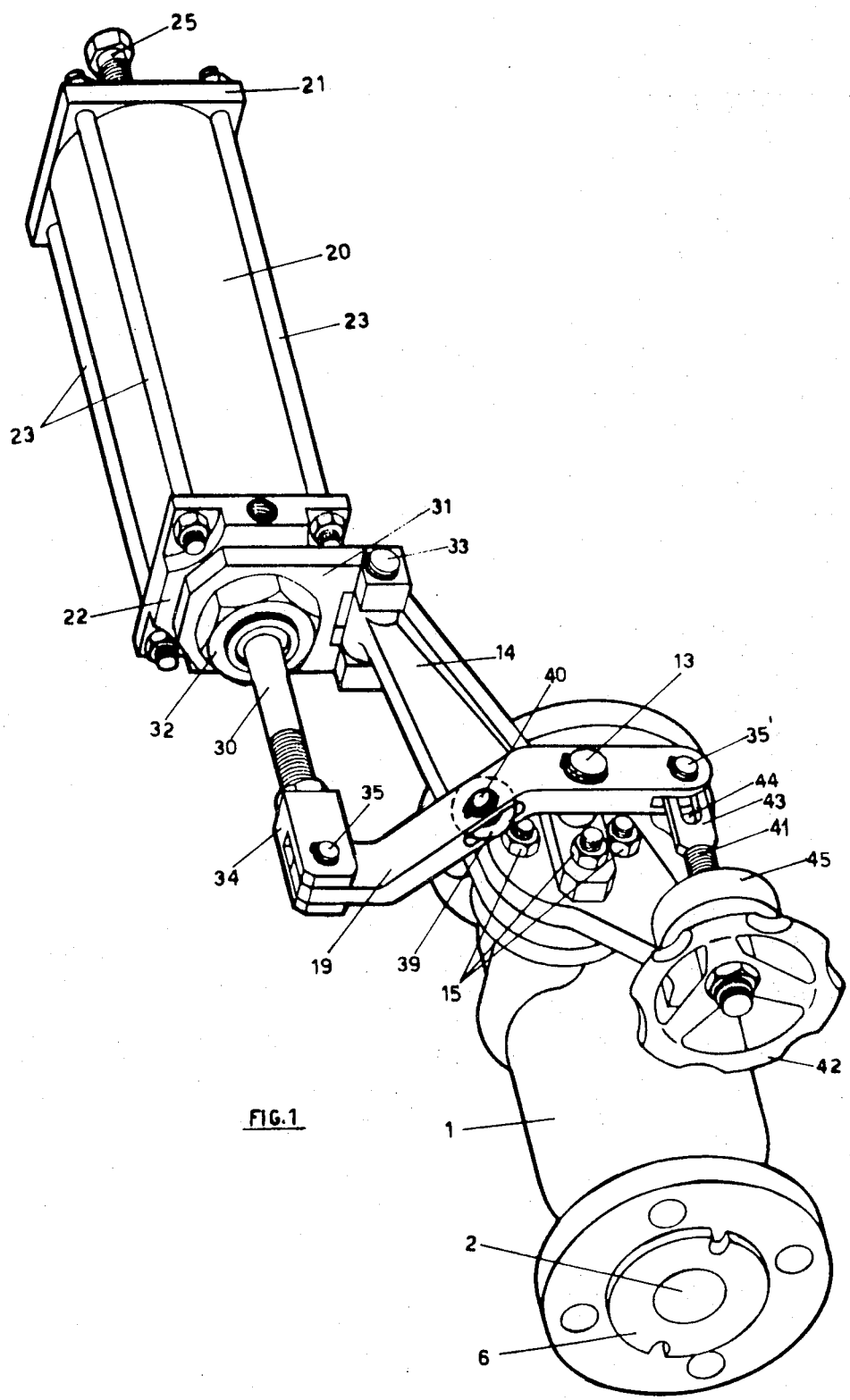
FIG. 1 is a perspective view of the adjusting valve with single seat and reversible drive according to the present invention and of the servomotor in the embodiment with double-acting manual adjustment.
Figure 2:
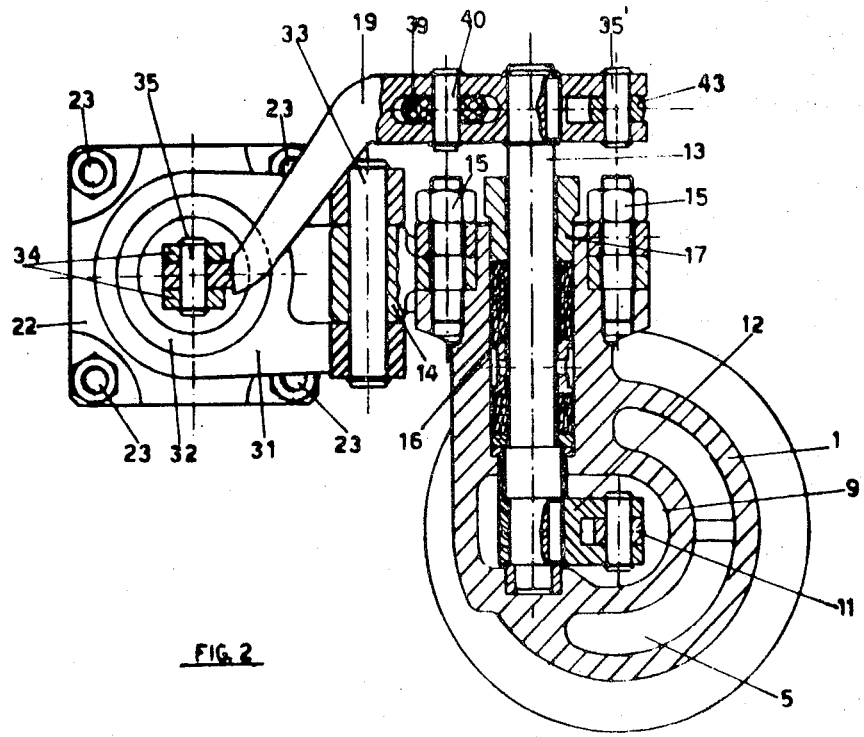
FIG. 2 is a partially cut-away top view of the whole valve of FIG. 1.
Figure 3:
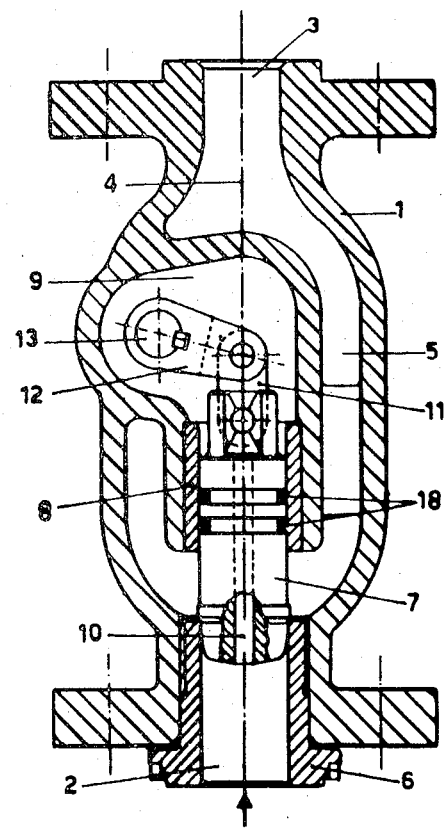
FIG. 3 is a front view of the valve according to the invention.

Referring to the FIGURES, number 1 indicates the valve body wherein inlet 2 and outlet 3 are located coaxially as to the symmetry axis 4 of the valve and communicate between them through the semi-annular chamber 5, so that the flow inside the valve runs in a rectilinear direction coinciding with axis 4. Inside inlet 2 there is tightly screwed valve seat 6 cooperating with a sliding shutter 7, which is movable along the symmetry axis 4, and is guided in its motion by a guide bush 8 supported by the walls of a compensating chamber 9 obtained at the middle point of the valve body in opposition to inlet 2.

Sliding shutter 7 presents a central hole 10 putting inlet 2 in communication with compensating chamber 9, and is formed in such a way that the effective area of its head is perfectly equal to the one of its back part. In this way the action exerted by the inlet pressure on the sliding-shutter head is compensated by the corresponding action exerted by the pressure into chamber 9, which pressure is the same as the inlet pressure, so that the sliding shutter is perfectly balanced and the only forces to be overcome in its driving are frictional forces. Sliding shutter 7 is then connected at its back part, inside chamber 9 and by means of a connecting rod 11, to a crank 12 keyed to a through stem 13, which is rotatably supported by valve body 1 and comes out from this and from a supporting stirrup 14 fixedly outwardly on the valve body by means of bolts 15. The seal of the compensating chamber 9 is obtained by making use of a packing 16 and a stuffing box 17 and by providing the sliding shutter 7 with sealing rings 18.

The sliding shutter 7 is driven by a servomotor acting on an extremity of a driving lever 19 keyed at a median point to said through steam 13 outwardly with respect to the valve body. In this way, in fact, an angular shifting of the extremity of said driving lever 19 causes a corresponding rotation of through stem 13 and therefore an opposite angular shifting of crank 12 with the consequence that sliding shutter 7 is axially shifted.

The servomotor shown in the drawing is of the piston type (but it could be of the membrane-type) and comprises a driving cylinder 20 closed by an upper plate 21 and a lower body 22 mutually clamped by means of tie rods 23. Upper plate 21 has an air-breathing hole 24 and supports the adjusting screw 25 acting on the cap 26 of a pressure spring 27 whose other extremity leans against the piston 28 of the driving cylinder 20. Lower body 22 has, on the contrary, an inlet opening 29 for the servomotor operating air and a central hole through which stem 30 of the driving cylinder passes. The servomotor is supported by a drilled backing plate 31 which is rigidly fixed to sid body 22 by means of a bolt 32 and to supporting stirrup 14 by means of check pin 33 respectively. The driving cylinder stem 30 is then screwed at its extremity to a fork 34 which is connected to an extremity of the driving lever 19 by means of a check pin 35.

The reversal of the servomotor action will be obtained by simply letting the servomotor act on the other extremity of the driving lever 19, i.e., by connecting fork 34 of stem 30 to said lever 19 by means of check pin 35', after backing plate 31 has been fixed to supporting stirrup 14 in an opposite way as to the figure, and that without requiring at all a disassembly of the valve body.

Figure 4:
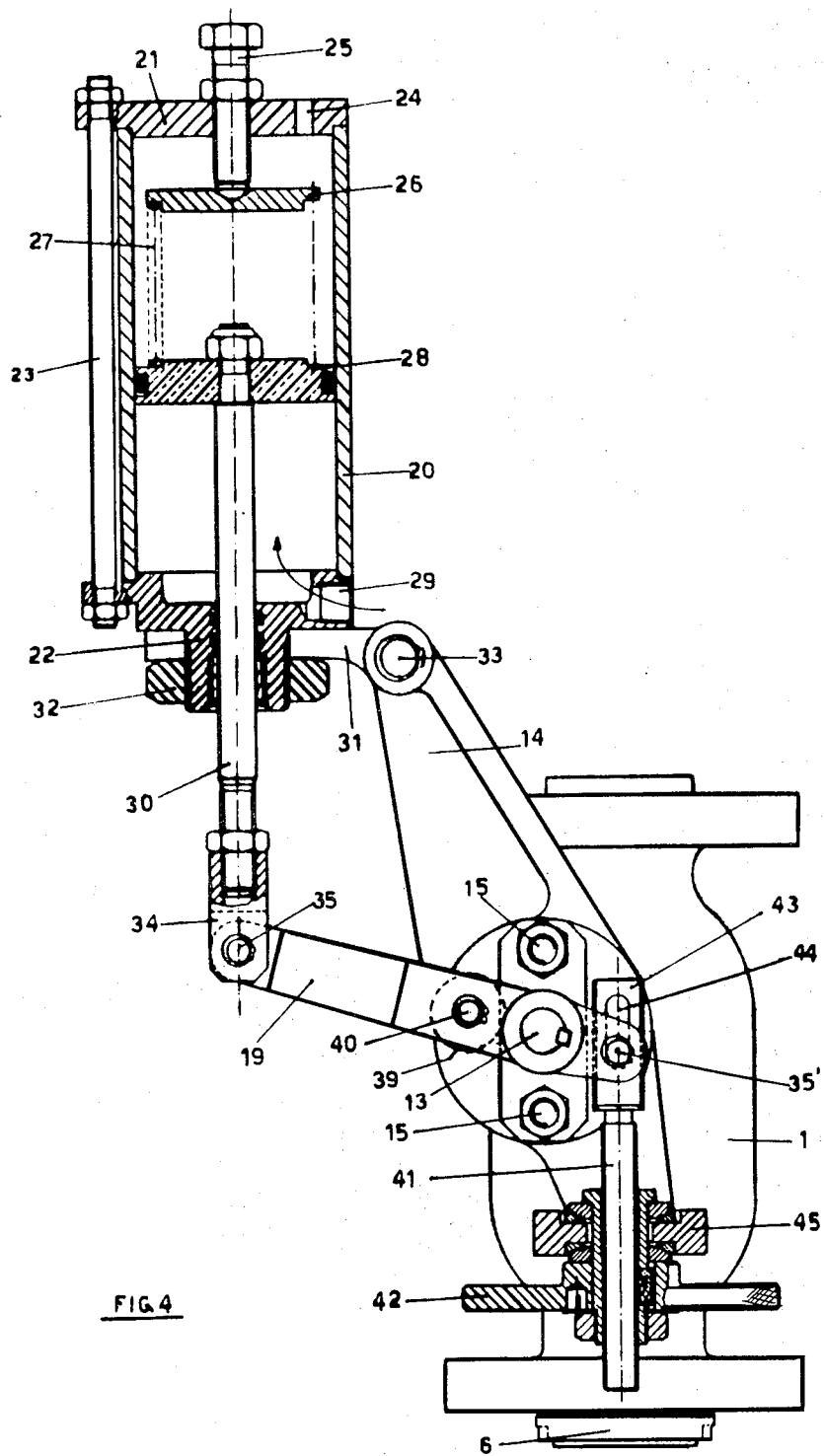
FIG. 4 is a partially cut-away front view of the whole valve of FIG. 1.
Figure 5:
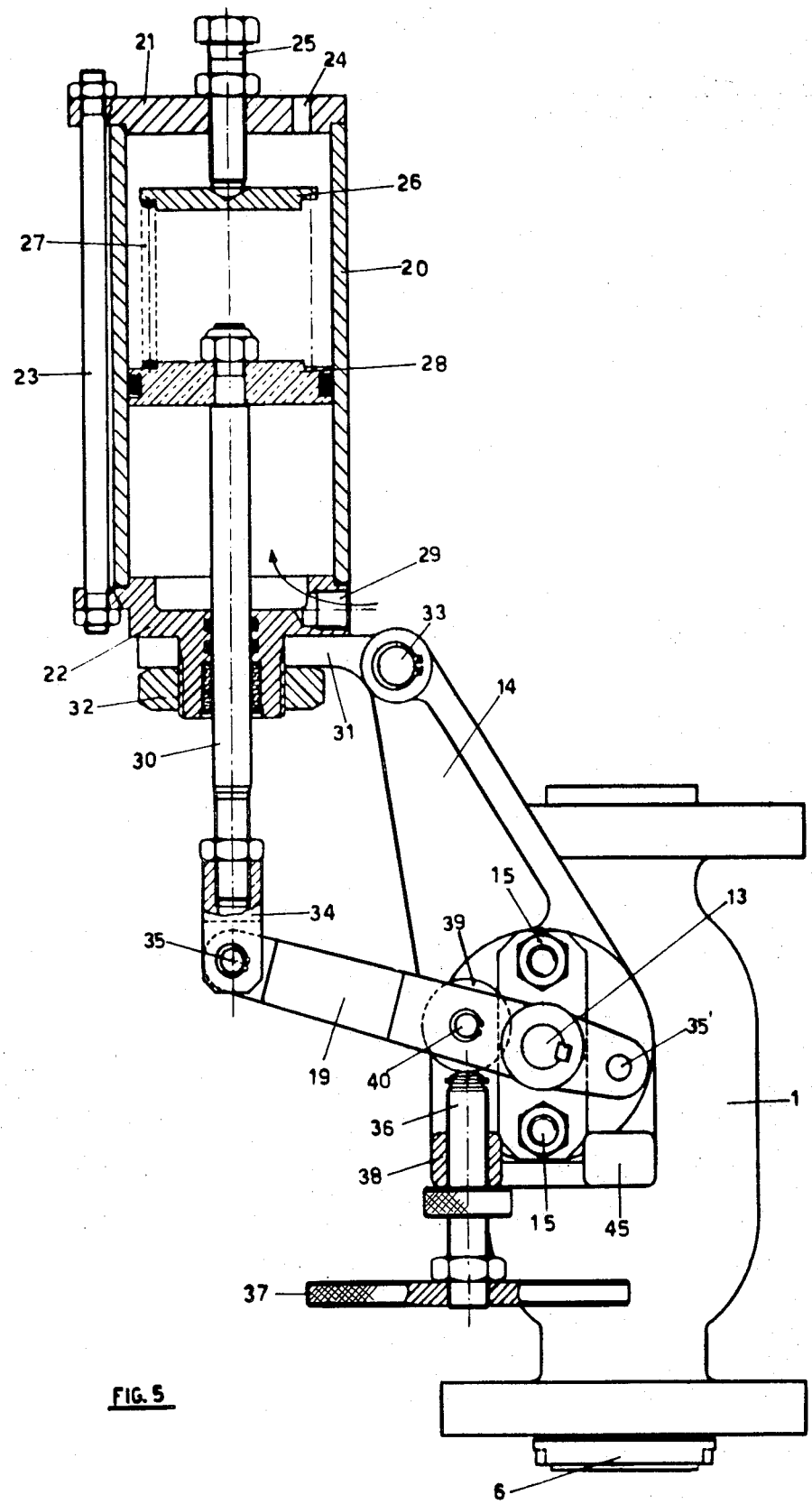
FIG. 5 is again a partially cut-away front view of the whole valve of FIG. 1 in the version having single-acting manual adjustment.

For the simple-acting manual valve adjustment (see specifically FIG. 5), a control screw 36 with an adjusting handwheel 37 is supported in a screwable way by an L-shaped stirrup 38 fixed to supporting stirrup 14 by means of the already cited bolts 15. Said control screw is positioned in such a way that its free extremity may come into contact with and act on a pressure washer 39 rotatably supported by a pin 40 in a slit of the driving lever 19, said slit being located between check pin 35 and through stem 13. In this way, in fact, the rotation of the handwheel 37 shifts the lever 19 and consequently the sliding shutter 7. In case, on the contrary, a double-acting manual adjustment is required, a control screw 41 having an adjusting handwheel 42 and carrying at its extremity an idle flat body 43 with an eyelet 44 (see specifically FIGS. 1 and 4), is mounted in a screwable way on a protruding support 45 of the supporting stirrup 14, while the already cited check pin 35' is inserted into eyelet 44 so that the control screw is connected to the free extremity of the driving lever 19 and may act on the latter and consequently on the sliding shutter of the valve. It is evident that eyelet 44 will have to present a length sufficient to allow the required stroke of the sliding shutter, i.e., the end positions of the check pin 35' inside the eyelet 44 have to correspond to the highest and lowest values of the required delivery respectively.

What I claim is:

1. An adjusting valve comprising, a valve body having inlet and outlet openings communicating with each other through a semi-annular valve chamber, a valve shutter in the chamber slidable along the path of fluid flow through said valve chamber to regulate the flow through the valve chamber, a valve seat means at one of said openings engageable by said valve shutter, means balancing the fluid pressure on said valve shutter, a driving servomotor corrected to said valve body, means transferring the servomotor action to the valve shutter, and means on said valve body for manually regulating the extent of the sliding movement of said valve shutter.

2. An adjusting valve according to claim 1 characterized in that said means for balancing said fluid pressure on said valve shutter comprises a central hole which passes axially through said shutter to a compensating chamber to which the inlet pressure is conveyed.

3. An adjusting valve according to claim 2 characterized in that the walls of said compensating chamber are the guide means for the axial movement of said valve shutter.

4. An adjusting valve according to claim 2 characterized in that said means for transferring the servomotor action to the valve shutter comprises a driving lever keyed at a median point outwardly from the valve body to a through stem that is rotatably supported by the same valve body, said through stem having a keyed crank which is connected to said valve shutter by means of a connecting rod.

5. An adjusting valve according to claim 4 characterized in that said crank and said connecting rod are located inside the said compensating chamber.

6. An adjusting valve according to claim 4 characterized in that the servomotor acts on one of the two extremities of said driving lever.

7. An adjusting valve according to claim 6 characterized in that the reversal of the servomotor action is obtained by having the servomotor act on an extremity of the driving lever, opposite from the one whereon it previously acted.

8. An adjusting valve according to claim 1 characterized in that said valve seat means is located inside the inlet opening of the valve.

9. An adjusting valve according to claim 1 characterized in that said means for manually regulating the extent of the sliding movement of said valve shutter is a single acting manual adjustment which comprises a control screw with an adjusting handwheel which is supported by the valve body and acts by having its free extremity contacting a pressure washer which is rotatable and is supported by a slit inside said means for transferring the servomotor action to the valve shutter.

10. An adjusting valve according to claim 1 characterized in that said means for manually regulating the extent of the sliding movement of said valve shutter comprise a double-acting manual adjustment which comprises a control screw which is provided with an adjusting handwheel and carries idly on its extremity a flat body provided with an eyelet, said control screw being supported by the valve body and connected to the extremity of the means for transferring the servomotor action to the valve shutter by a check-pin means inserted into said eyelet.

11. An adjusting valve according to claim 1 wherein the inlet and outlet openings are aligned.

12. An adjusting valve according to claim 1 wherein said aligned inlet and outlet openings communicate linearly through said semi-annular valve chamber.

* * * * *